United States Patent [19]

Dupont et al.

[11] Patent Number: 5,317,401
[45] Date of Patent: May 31, 1994

[54] APPARATUS FOR PROVIDING CONTRAST AND/OR BRIGHTNESS CONTROL OF A VIDEO SIGNAL

[75] Inventors: Antoine Dupont, Strasbourg; Bernard Hepp, Sevres; Eric Benoit, Eybens, all of France

[73] Assignee: Thomson Consumer Electronics S.A., Courbevoie, France

[21] Appl. No.: 77,843

[22] Filed: Jun. 15, 1993

[30] Foreign Application Priority Data

Jun. 19, 1992 [EP] European Pat. Off. .......... 92401737

[51] Int. Cl.⁵ .................................................. H04N 5/57
[52] U.S. Cl. ................................. 368/678; 345/94; 345/98; 348/687
[58] Field of Search .............. 358/168, 169; 345/89, 345/94, 98–100; H04N 5/57

[56] References Cited

U.S. PATENT DOCUMENTS

| | | | |
|---|---|---|---|
| 3,585,517 | 6/1971 | Herbert | 330/10 |
| 4,488,150 | 12/1984 | Kanatani | 340/781 |
| 4,888,599 | 12/1989 | Harwood et al. | 345/89 X |
| 5,072,299 | 12/1991 | Park | 358/169 |
| 5,170,155 | 12/1992 | Plus et al. | 345/100 |

FOREIGN PATENT DOCUMENTS

| | | | |
|---|---|---|---|
| 0391654 | 10/1990 | European Pat. Off. | G09G 318 |
| 0417578A2 | 3/1991 | European Pat. Off. | G09G 336 |

*Primary Examiner*—James J. Groody
*Assistant Examiner*—John W. Miller
*Attorney, Agent, or Firm*—Joseph S. Tripoli; Eric P. Herrmann; Ronald H. Kurdyla

[57] ABSTRACT

The present invention is a video drive apparatus of the two ramp type which includes facility to selectively adjust the brightness and/or the contrast of an image reproduced on a display device. In this apparatus, at least one of the ramp signals is generated digitally by for example a counter. Provision is made to change the counting rate of such counter which effects a change in display contrast. Provision is also made to selectively change the phase of the ramp signal applied to the second stage relative to the start of respective pulses of the PWM signal thereby effecting brightness changes in the reproduced image.

9 Claims, 2 Drawing Sheets

APPARATUS FOR PROVIDING CONTRAST AND/OR BRIGHTNESS CONTROL OF A VIDEO SIGNAL

The present invention relates to signal translation circuitry and more particularly to circuitry for applying video drive signal to liquid crystal displays.

BACKGROUND OF THE INVENTION

It is known to amplify a signal by converting such signal to a pulse-width modulated (PWM) signal and thereafter to convert the PWM signal to an amplified signal by utilizing the PWM signal to sample a linear ramp. The duty cycle of the PWM signal is dependent upon the amplitude of the input signal and the value of the output signal is subsequently dependent upon this duty cycle.

This is a two stage process carried out in a two stage circuit. The first stage of such an amplifier compares the voltage value of the input signal with a first linear voltage ramp which swings from a first, or low, amplitude value to a second, or high, amplitude value. For the duration that the ramp voltage is lower than the input signal voltage, the amplitude of the PWM signal is conditioned to be high. When the voltage of the ramp signal exceeds the voltage of the input signal, the PWM signal is conditioned to be low.

The second stage of the amplifier compares the PWM signal with a second linear ramp signal with a predetermined dv/dt or slope, e.g., from low to high. The PWM signal samples the second ramp signal at the high-to-low transition of the PWM signal and thereby generates the output voltage with a value which depends on the duty cycle of the PWM signal.

It is known to utilize the aforementioned type of amplifying apparatus to apply a video signal to the column busses of liquid crystal display (LCD) devices. In such devices a driven LCD pixel changes its reflectivity or transparency respectively responsive to the value of the video output signal.

SUMMARY OF THE INVENTION

The gain of such an amplifier may be established by judicious selection of the slope and/or the voltage limits of the first and/or the second linear ramp signal.

The contrast displayed by a LCD may be selected by the range or difference between the minimum and the maximum amplitude values available to represent the output video signal. The average brightness of this video signal depends on the value of the minimum amplitude exhibited by the video signal. In other words the contrast of the displayed video signal depends on the gain of the amplifier and the brightness on the DC value of the output signal.

It is an object of the present invention to change the gain of an amplifier of the type mentioned and/or to change the DC level of its output signal in a reliable, repeatable manner.

The present invention is a video drive apparatus of the two ramp type which includes facility to selectively adjust the brightness and/or the contrast of an image reproduced on a display device. In this apparatus, at least one of the ramp signals is generated digitally by for example a counter. Provision is made to change the counting rate of such counter which effects a change in display contrast. Provision is also made to selectively change the phase of the ramp signal applied to the second stage relative to the start of respective pulses of the PWM signal thereby effecting brightness changes in the reproduced image.

DETAILED DESCRIPTION

Figure 1:
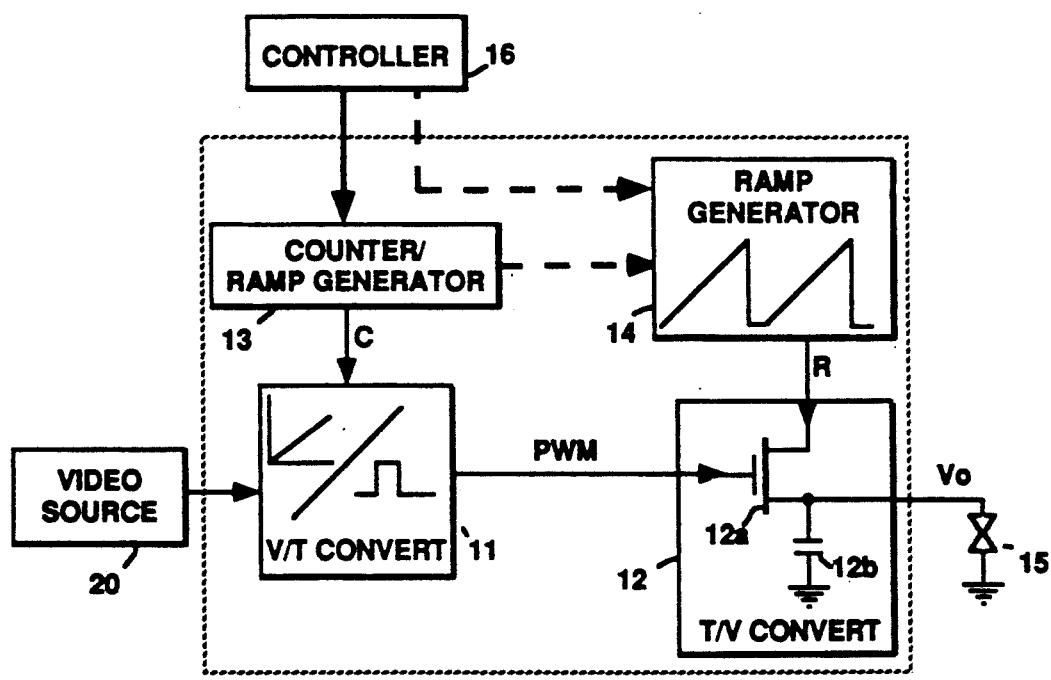
FIG. 1 is a partial block, partial schematic diagram of apparatus embodying the invention.

It is mentioned at the outset that the blocks in FIG. 1 may or may not be separate entities, and are included in the drawing to illustrate certain functions and serve to provide a better understanding of the invention. As such ones of the blocks or units may be realized in integrated or hybrid technology or as an appropriately programmed microprocessor. For example, if the input video signal is in digital format, and the first linear ramp is digital, the ramp may be generated via software in a microprocessor, and the comparison of the digital video signal with the ramp signal may all be performed in the microprocessor arithmetic logic unit. Of course the elements represented by the blocks may be realized as separate circuit elements.

FIG. 1 shows a preferred embodiment of the invention.

In FIG. 1 an amplifier or LCD driver circuit includes a voltage-to-time (V/t) converter 11 and a time-to-voltage (t/V) converter 12. An video input signal Vi, is provided by a video source 20, which may be a camera, a video recorder, a video memory, digital and/or analog, or the like. The video signal is coupled to a first input terminal of the V/t converter 11, and a first ramp signal provided by a counter 13 is coupled to a second input terminal of the converter 11. Responsive to the video signal and the first ramp signal the converter 11 generates a PWM signal having pulse widths proportional to the amplitude values of applied video samples.

Figure 2:
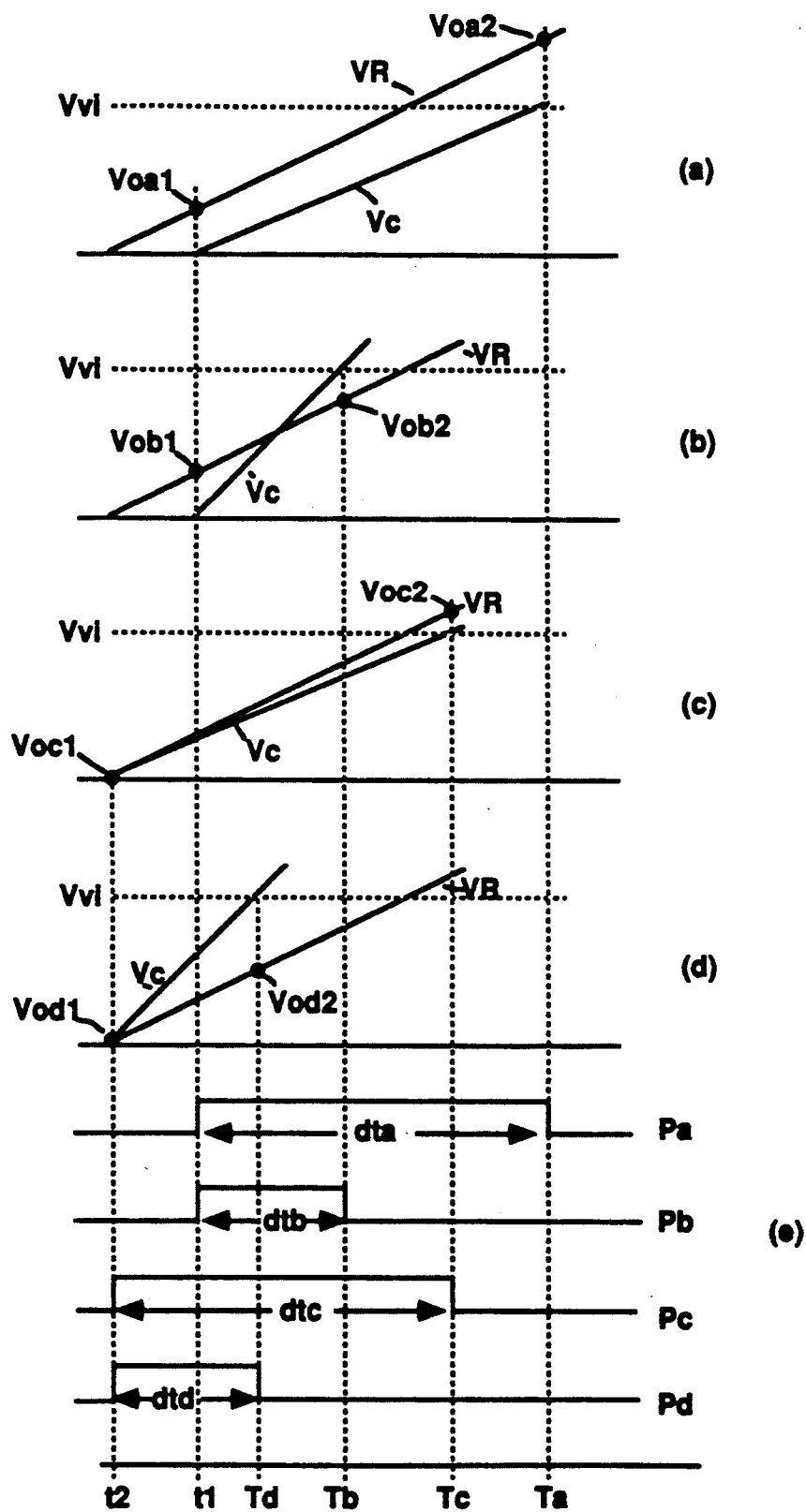
FIG. 2 is a signal waveform diagram useful in describing the embodiment of FIG. 1.

The PWM signal is coupled to a first input terminal of the time-to-voltage (t/V) converter 12. A second ramp signal generated by element 14 is coupled to a second input terminal of the converter 12. In principal the ramp voltage generator 14 supplies a ramp voltage signal VR similar to the waveform indicated inside block 14 and which is also shown in FIG. 2. The output signal Vo of the converter 12 is coupled to further means, in this embodiment to a LCD panel 15.

The (t/V) converter 12 may include an MOS transistor 12a, having a source electrode connected to the generator 14, and a drain electrode connected to a first terminal of a capacitor 12b from which the output signal Vo can be taken. A second terminal of capacitor 12b is connected to a reference potential. The gate electrode of the MOS transistor 12a is coupled to accept the PWM signal generated by element 11.

Element 16 controls the counter 13 and thereby the contrast and/or brightness of the video signal displayed by the LCD array. Element 16 selectively supplies parameters such as clock frequency to control the rate at which the counter counts, and the counter start time. Counter start time in this embodiment is established relative to the start of the ramp signal developed by the generator 14. Element 16 may also control the ramp generator 14, that is it may set the amplitude limit values of the signal R, the slope of the ramp and the start time of the ramp. The counter 13 may also provide a clocking signal to the ramp generator 14 such that the timing relationships between the respective ramps are synchronous.

Detailed descriptions of the function of an amplifier of the type mentioned are given in U.S. Pat. No. 4,488,150. Further details will be explained in the following description only so far as it is necessary for the understanding of the present invention. Referring to FIG. 1, as long as the signal PWM is high, the transistor 12a is conductive and the capacitor 12b is charged by the ramp voltage signal VR from the generator 14. When the PWM signal goes "low", the transistor 12a is rendered non-conductive and the instantaneous value of the signal VR is stored on the capacitor 12b, thereby converting the PWM signal to a sampled data analog amplitude value.

FIG. 2 shows waveform diagrams of signals which may occur in the embodiment of FIG. 1. These signals are indicated as continuous i.e., analog ramps, however they may be stair step ramps generated by, for example, a digital accumulator which accumulates modulo M, by incrementing a value by one unit each clock period, where M is a predetermined integer, or the ramp may be represented by a monotonically increasing/decreasing cyclinically occurring sequence of binary numbers. If the ramps are generated digitally and synchronously, it will be appreciated that it is an easy matter to change the count or accumulate start time of one ramp generator relative to the other simply by differentially applying counting signals to the respective counters, and it is an easy matter to change the slope of such ramp by changing the incremental value or the increment rate. Those skilled in the art of circuit design will be familiar with other approaches for generating digital ramps such as clocking a binary counter, and changing the slope of ramps generated thereby by changing the clocking frequency.

FIG. 2 shows PWM signals Pa, Pb, Pc, ..., Pd generated by the converter 11 for the respective conditions a, b, c, d. The ramp labelled Vc is generated by the counter 13. Vvi is a representative video signal sample value. The signal VR is the ramp generated by the generator 14. PWM pulses generated by the converter 11 are initiated by the start time of the ramp Vc, i.e., time (t1) for conditions (a) and (b) and (t2) for conditions (c) and (d). Consider condition (a) where the counter 13 is started at time ((t1)). The pulse signal Pa is set "high" at time ((t1)) and after a time dta, when the ramp Vc crosses the amplitude Vvi, the signal Pa is set "low" (at t=Ta). Note condition b where Vc crosses the amplitude level Vvi at time Tb establishing the pulse width of pulse Pb at dtb. For condition (b), the slope of ramp Vc is much steeper than in condition (a), resulting in pulse width Pb being narrower than pulse width Pa for the same input amplitude value Vvi.

The points Voa1, Vob1, Voc1. and Vod1 indicate the respective voltage values exhibited by the ramp signal VR when the transistor 12a is switched from the non-conductive to the conductive condition by the pulses Pa, Pb, Pc and Pd respectively. The amplitudes Voa1,.Vob1,.Voc1. and Vod1 are applied to the capacitor 12b at the instant when the counter 13 is started and the points Voa2, ..., Vod2 indicate the final values of voltages stored on capacitor 12b when the transistor 12a is switched from the conductive to the non-conductive state.

Consider that the signals available on capacitor 12b are used to energize a liquid crystal display (LCD) device. The minimum amplitude available to energize the LCD establishes the minimum brightness of the displayed image. It can be seen that for (t1), the start time of the ramp Vc, occurring after the start of the ramp VR, the minimum amplitude (e.g., amplitudes Voa1 or Vob1) is larger than the minimum amplitude when both ramps are started simultaneously (e.g., amplitudes Voc1 or Vod1). As a consequence it is possible to adjust the average brightness of the reproduced video signal by adjusting the phase of the ramp Vc relative to the ramp VR. This is most easily accomplished where both ramps are generated digitally, and the application of a common clock signal to both digital ramp generators is delayed for one of the generators relative to the other. Alternatively both digital ramp generators may be energized by a common clock signal, but one or the other of the generators may be enabled at a later time than the other.

Next consider that the contrast of the reproduced image is determined by the range of output amplitude values available to drive the display. Notice in FIG. 2 that when the slope of the ramp Vc is steeper, (conditions b and d) the range of output values (Vob2–Vob1, and Vod2–Vod1) is less than when the slope of the ramp signal Vc is less steep (Voa2–Voa1 and Voc2–Voc1). As a consequence it is possible to adjust the contrast of the reproduced image by adjusting the relative slopes of the two ramp signals. Again this is accomplished most reliably if both ramps are generated digitally, as the ramp slopes can be accurately set and will not drift with circuit aging.

Assuming that the slope of the ramps Vc and VR are respectively the same for conditions b and d, the pulse widths Pc and Pd will be equal and the ranges of amplitudes Vob2–Vob1 and Vod2–Vod1 will also be equal. Therefore the contrast of the image reproduced by conditions b and d will be equal. However the brightness of the images reproduced by the conditions b and d are different. The relative brightness is a function of the relative start times of the ramps Vc and VR. It can be seen from FIG. 2 that as long as the start time of the ramp Vc occurs after or simultaneously with the start of the ramp VR, the contrast and brightness may be adjusted independently without one affecting the other.

In conclusion it may be mentioned that through the embodiment of FIG. 1 brightness and/or contrast of a video signal to be displayed via a LCD panel can be changed very easily, by for example changing a counter clock frequency and the starting point of a counter or accumulator.

Versions of the above mentioned embodiments may include at least one of the following variations:

the ramp generator 14 may generate a ramp signal with a decreasing sawtooth. This has the advantage that the value of the voltage stored in capacitor 12b is more independent on its capacitance. In this instance an inverter must be provided between the converter 12 and the LCD display device;

the start values of ramp generator counter (brightness) and/or counter clock frequency (contrast) can be controlled by control means in dependence on given set values and sensor signals;

a buffer amplifier and/or filter means may be provided, e.g., between the converter 12 and the LCD 15.

What is claimed is:

1. Apparatus for translating a video signal for reproduction of a video image on a display device comprising:

a source of video signal;

digital ramp generator for generating a ramp signal which increases at a controlled rate responsive to a control signal;

an amplitude to pulse width converter having first and second input terminals coupled respectively to receive said video signal and said ramp signal, said pulse width converter providing pulses exhibiting a first state for the duration the amplitude of the video signal is greater than the ramp signal and exhibiting a second state when the ramp signal exceeds the video signal;

control means for generating said control signal, said control signal conditioning said digital ramp generating means to increase or decrease said controlled rate and thereby control the contrast of the displayed image; and a pulse width to amplitude converter, responsive to said pulses for generating a sampled signal to drive the display device.

2. The apparatus set forth in claim 1 wherein said pulse width to amplitude converter comprises:

a further ramp signal generator for generating a further ramp signal;

a capacitance having first and second electrodes, the second electrode being coupled to reference potential;

a device having a control electrode coupled to receive said pulses and having a selectively conductive conduction path coupled between said further ramp generator and the first electrode of said capacitor; said first electrode of said capacitor providing said sampled signal; and means for controlling the relative phase of the beginning of said further ramp signal and the transition of respective said pulses that render said device from a non-conductive to a conductive condition and thereby to adjust the brightness of the displayed image.

3. The apparatus set forth in claim 2 wherein said digital ramp generator includes a counter, and the means for controlling the relative phase conditions of said counter to start said ramp a predetermined times relative to the start of said further ramp signal.

4. The apparatus set forth in claim 1 wherein said digital ramp generator includes a controlled counter for changing the slope of the ramp signal.

5. Apparatus for translating a video signal for reproduction of a video image on a display device comprising:

a source of video signal;

an amplitude to pulse width converter responsive to said video signal for providing pulses having pulse widths proportionally related to the amplitude of said video signal;

digital ramp generator for generating a ramp signal;

a pulse width to amplitude converter responsive to said pulses and said ramp signal for generating analog amplitude values to drive said display device; and means for controlling the phase of one of the transitions of respective said pulses relative to the start time of said ramp signal to control the brightness of images reproduced on said display device.

6. The apparatus set forth in claim 5 wherein said means for controlling includes a further ramp generator included in said amplitude to pulse width converter.

7. The apparatus set forth in claim 6 wherein said means for controlling further includes:

a counter for generating said further ramp signal as sequences of ascending/descending digital values; and means for controlling the rate of incrementing said digital values provided by said counter.

8. The apparatus set forth in claim 6 wherein said means for controlling includes means for determining the relative start times of said further ramp signal and said ramp signal.

9. The apparatus set forth in claim 6 further including means for changing the slope of one of said ramp and further ramp signals to effect contrast changes in said reproduced images.

* * * * *